United States Patent [19]
Fleming

[11] Patent Number: 5,170,903
[45] Date of Patent: Dec. 15, 1992

[54] PIZZA BOX REFUSE CONTAINER

[76] Inventor: Tony K. Fleming, 9844 Hertzfeld Rd., Waterville, Ohio 43566

[21] Appl. No.: 729,172

[22] Filed: Jul. 12, 1991

[51] Int. Cl.$^5$ .............................................. B65D 90/00
[52] U.S. Cl. .................... 220/87.2; 220/909; 220/23.4
[58] Field of Search .............. 220/23.4, 908, 909, 220/87.1, 87.2, 482

[56] References Cited

U.S. PATENT DOCUMENTS

| | | | |
|---|---|---|---|
| 962,887 | 6/1910 | Bolger | 220/87.2 |
| 1,092,752 | 7/1914 | Segall | 220/87.2 |
| 1,888,127 | 11/1932 | Hearne | 220/482 X |
| 2,281,630 | 5/1942 | Southard | 220/87.2 |
| 2,434,238 | 1/1948 | Wolfson | 220/87.2 |
| 3,307,902 | 3/1967 | Nardi | 220/87.2 |
| 3,393,825 | 7/1968 | Clauser | 220/87.2 |
| 3,951,486 | 4/1976 | Tracy | 220/482 X |
| 5,092,480 | 3/1992 | Waterson | 220/909 X |

Primary Examiner—Steven M. Pollard
Attorney, Agent, or Firm—Leon Gilden

[57] ABSTRACT

A refuse container mounts an auxiliary refuse container to a side wall of the refuse container, wherein the auxiliary container is defined by an internal cavity to complementarily receive a plurality of used pizza boxes of parallelepiped construction. Modifications of the invention include the auxiliary container formed of an expandable construction.

8 Claims, 4 Drawing Sheets

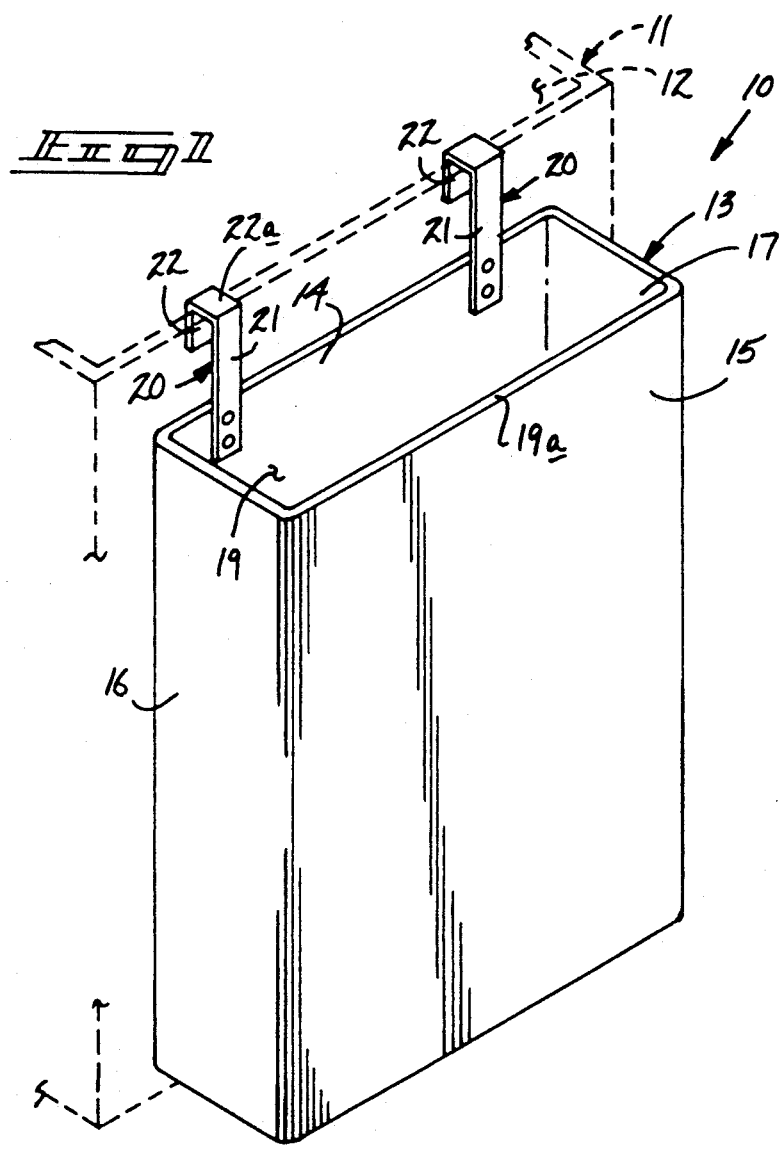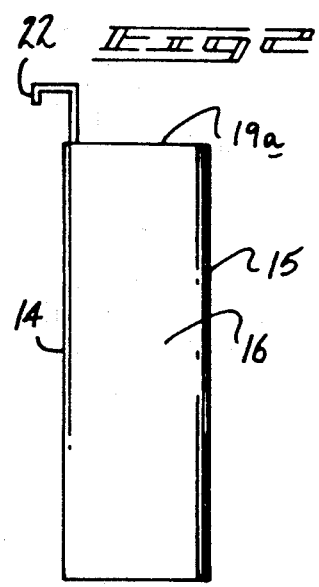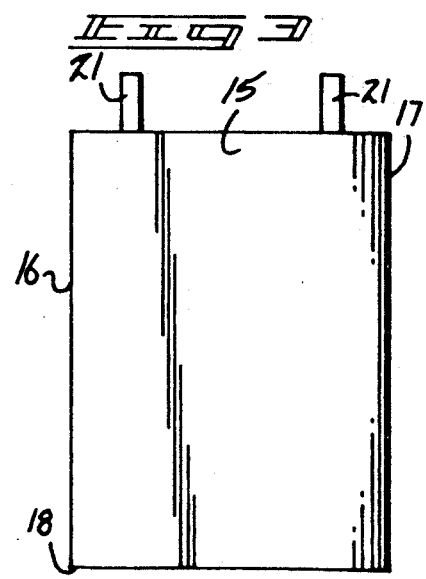

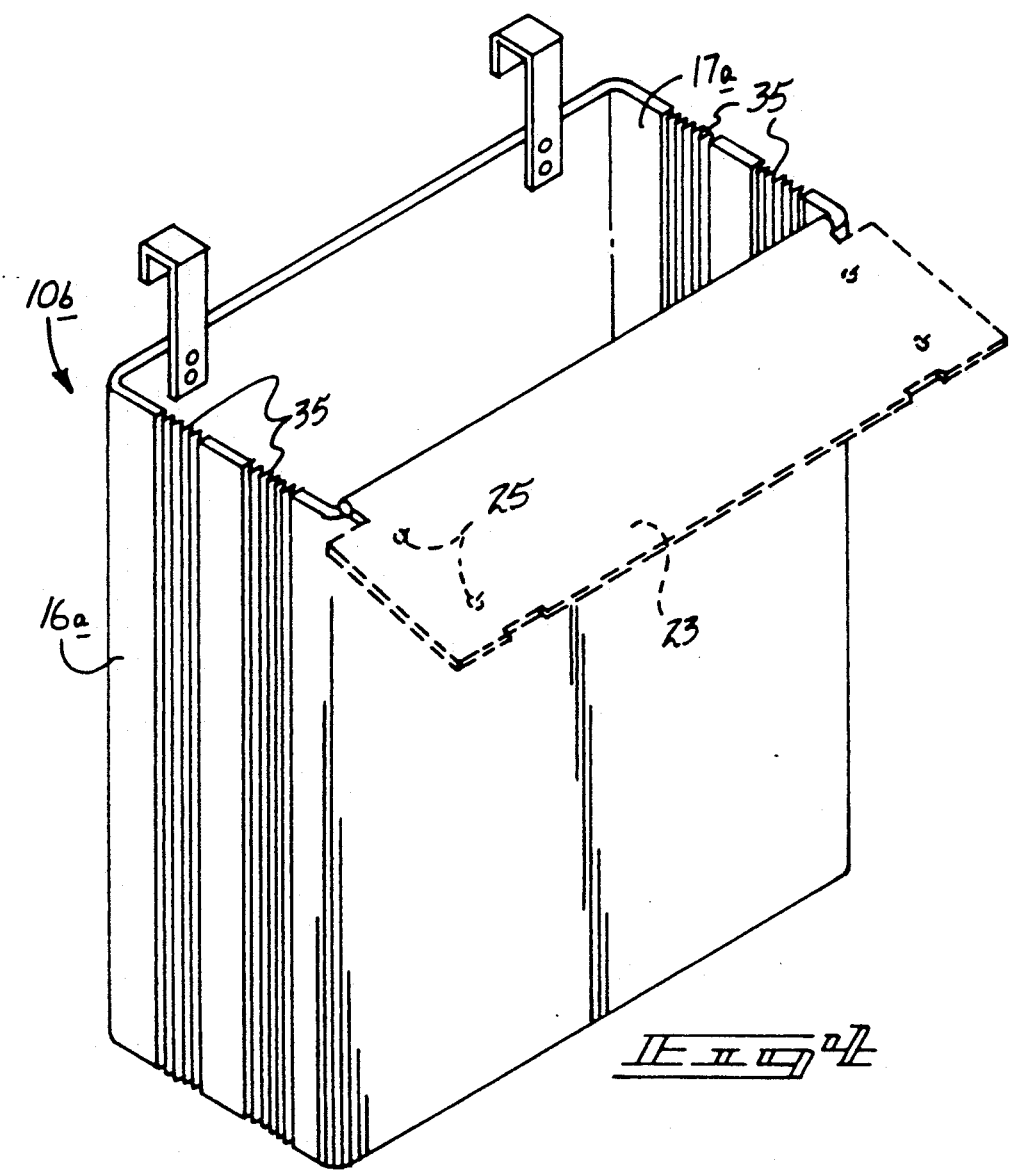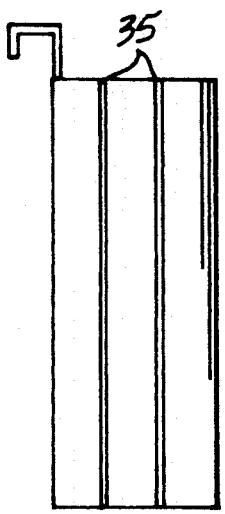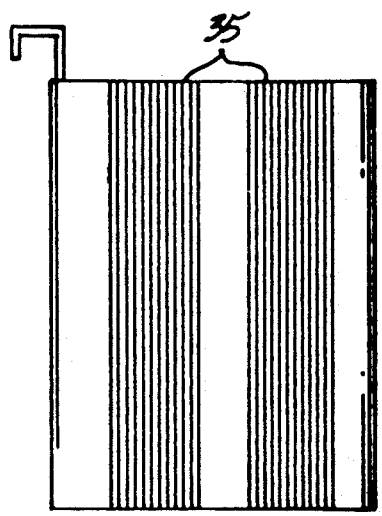

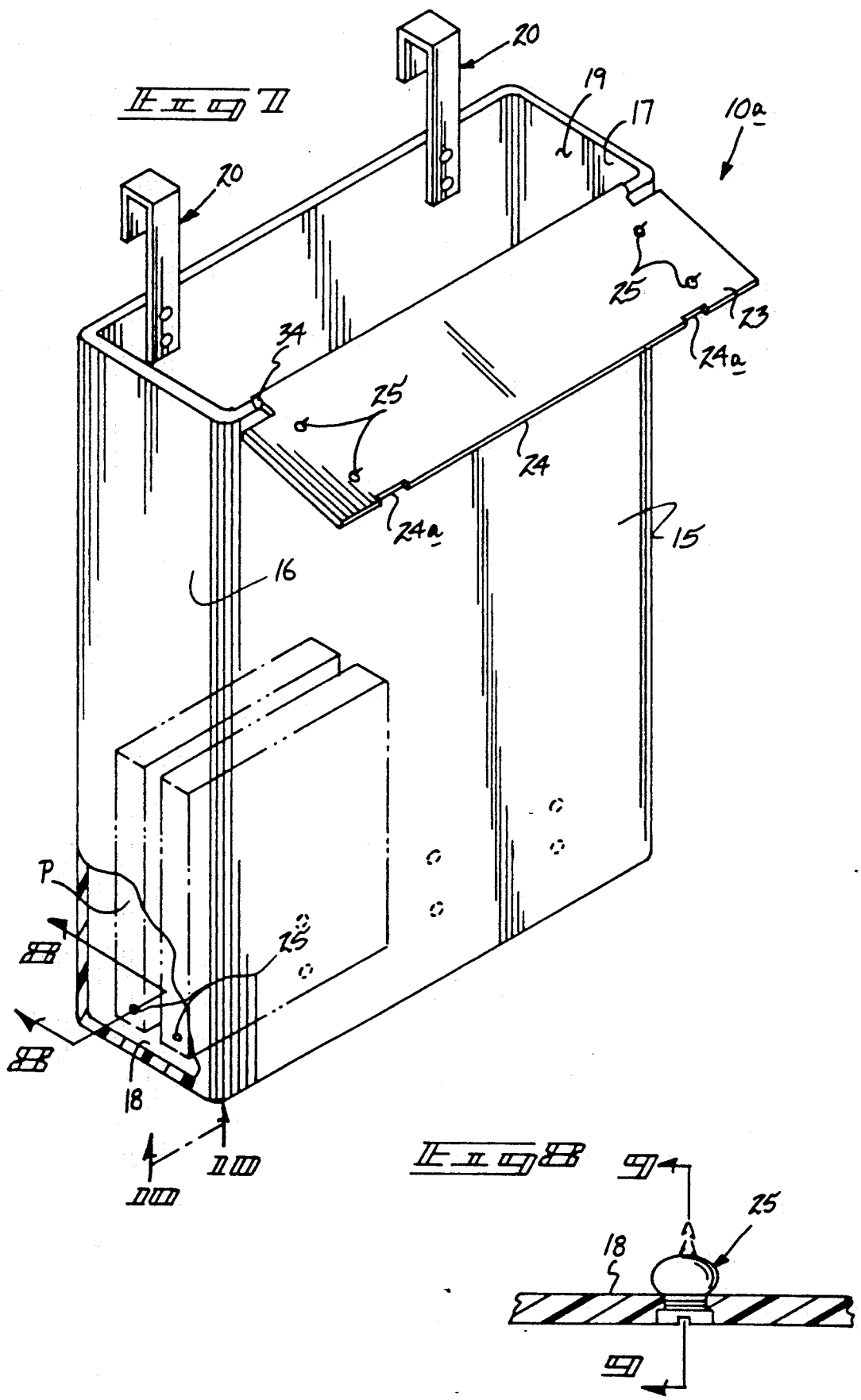

PIZZA BOX REFUSE CONTAINER

BACKGROUND OF THE INVENTION

1. Field of the Invention

The field of invention relates to refuse containers, and more particularly pertains to a new and improved pizza box refuse container wherein the same is arranged for the containment of pizza boxes subsequent to their use.

2. Description of the Prior Art

Disposal of pizza boxes is at times an awkward procedure due to the bulky construction of such boxes that utilize a disportionate amount of available room within conventional refuse containers. A single pizza box in many conventional refuse containers will fill up such a conventional container in an inefficient use of available container volume.

Prior art structure for containers is exemplified in U.S. Pat. No. 4,801,034 to Sandomeno setting forth a recycling container utilizing compartments with receptacles removably mounted therefrom.

U.S. Pat. No. 3,893,615 to Johnson sets forth a multi-compartment refuse container, each of a rectilinear cross-sectional configuration.

U.S. Pat. No. 4,821,903 to Hayes sets forth a trash bin and cart, wherein the trash bin utilizes a plurality of aligned rectilinearly configured compartments.

As such, it may be appreciated that there continues to be a need for a new and improved pizza box refuse container as set forth by the instant invention which addresses both the problems of ease of use as well as effectiveness in construction in providing storage for pizza boxes to be disposed in an efficient use of space and in this respect, the present invention substantially fulfills this need.

SUMMARY OF THE INVENTION

In view of the foregoing disadvantages inherent in the known types of refuse containers now present in the prior art, the present invention provides a pizza box refuse container wherein the same is securable to an associated refuse container and accommodates a plurality of pizza boxes in a convenient stored manner. As such, the general purpose of the present invention, which will be described subsequently in greater detail, is to provide a new and improved pizza box refuse container which has all the advantages of the prior art refuse containers and none of the disadvantages.

To attain this, the present invention provides a refuse container mounting an auxiliary refuse container to a side wall of the refuse container, wherein the auxiliary container is defined by an internal cavity to complementarily receive a plurality of used pizza boxes of parallelepiped construction. Modifications of the invention include the auxiliary container formed of an expandable construction.

My invention resides not in any one of these features per se. but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pizza box refuse container which has all the advantages of the prior art refuse containers and none of the disadvantages.

It is another object of the present invention to provide a new and improved pizza box refuse container which may be easily and efficiently manufactured and marketed.

It is a further object of the present invention to provide a new and improved pizza box refuse container which is of a durable and reliable construction.

An even further object of the present invention is to provide a new and improved pizza box refuse container which is susceptible of a low cost of manufacture with regard to both materials and labor, and which accordingly is then susceptible of low prices of sale to the consuming public, thereby making such pizza box refuse containers economically available to the buying public.

Still yet another object of the present invention is to provide a new and improved pizza box refuse container which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic side view of the instant invention.

FIG. 3 is an orthographic frontal view of the instant invention.

FIG. 4 is an isometric illustration of a modified aspect of the invention.

FIG. 5 is an orthographic side view of the invention, as illustrated in FIG. 4.

FIG. 6 is an orthographic side view of the invention, as illustrated in FIGS. 4 and 5 in an extended configuration.

FIG. 7 is an isometric illustration of a further modified aspect of the invention.

FIG. 8 is an orthographic view, taken along the lines 8—8 of FIG. 7 in the direction indicated by the arrows.

DESCRIPTION OF THE PREFERRED EMBODIMENT

Figure 9:
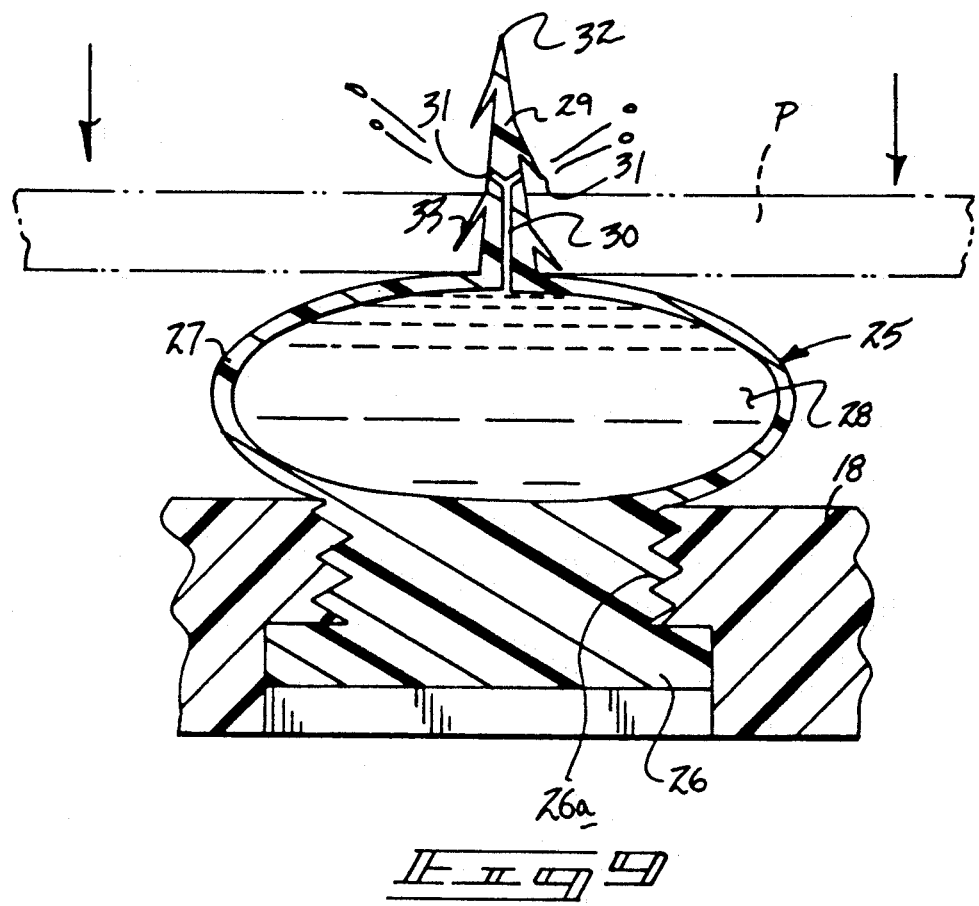
FIG. 9 is an orthographic view, taken along the lines 9—9 of FIG. 8 in the direction indicated by the arrows.
Figure 10:
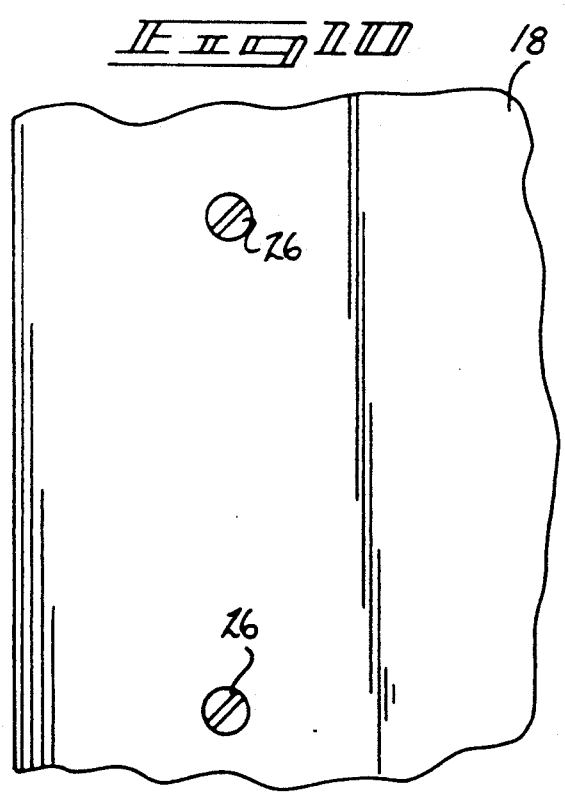
FIG. 10 is an orthographic view, taken along the lines 10—10 of FIG. 7 in the direction indicated by the arrows.

With reference now to the drawings, and in particular to FIGS. 1 to 10 thereof, a new and improved pizza box refuse container embodying the principles and concepts of the present invention and generally designated by the reference numerals 10, 10a, and 10b will be described.

More specifically, the pizza box refuse container 10 of the instant invention essentially comprises a primary refuse container 11, including a primary container side wall 12 defined by a predetermined height selectively mounting the refuse container 13 to the primary container side wall 12. The refuse container 13 includes an interior side wall 14 spaced from and parallel an exterior side wall 15. A first end wall 16 is spaced from and parallel a second end wall 17 defining a rectilinear parallelepiped configuration, with a rectilinear opening 19 defined by a continuous coplanar top edge 19a. The interior side wall 14 includes a plurality of spaced "U" shaped supports 20 spaced apart a predetermined spacing. Each "U" shaped support includes a first support leg 21 mounted to an interior surface of the interior side wall 14 extending orthogonally above the coplanar top edge 19a, including a second support leg 22 oriented parallel relative to the first support leg, with the first and second support legs interconnected by a connecting web 22a. The refuse container 13 defines a predetermined length from the connecting web 22a to an associated floor 18 of the refuse container that is less than a defined length of the side wall 12 from a top edge to a bottom edge thereof, as illustrated in FIG. 1, to permit suspended support of the refuse container 13 to the primary refuse container 11.

A modified refuse container 10a, as illustrated in FIGS. 7-10, wherein a lid plate 23 includes a lid plate first edge 24 defined by spaced recesses 24a spaced apart the predetermined spacing to receive the first support legs 22 therewithin when the lid plate 23 is in a closed configuration to overlie the opening 19. The lid plate 23 is further of a predetermined width defining a predetermined width of the opening 19. Fluid injection members 25 orthogonally project through an interior surface of the lid plate 23 and the floor 18 to include (see FIGS. 8-10) a rigid externally threaded support base 26 to be received within an internally threaded bore 26a of the floor 18. A resilient and compressible reservoir housing 27 is mounted at a forward terminal end of the base 26, including a fumigant fluid 28 therewithin, or optionally utilizing various insecticides to maintain cleanliness and reduce odor within the refuse container organization 10a. An injection head 29 is mounted coaxially aligned with the base 26 to an upper end of the reservoir housing 27, wherein the injection 29 includes a fluid conduit 39 in fluid communication with the reservoir housing 26, with a plurality of fluid conduit ports 31 extending laterally of the primary fluid conduit 30, whereupon compressing of the reservoir housing 27 by a pizza box "P", the fluid 28 is projected through the pizza box "P" by way of the fluid conduit ports 31. A pointed forward end 32 oversees a projection of the injection head 29 through the pizza box "P", with a plurality of mounting and alignment barbs 33 arranged to secure the pizza box "P" relative to and in contiguous relationship with the compressible housing 27 to ensure projection of the fluid 28 interiorly of the box "P". A lid hinge 34 mounts the lid 23 to the upper edge of the exterior side wall 15 to include a plurality of the fluid injection members 25 therethrough, whereupon filling of the refuse container through the opening 19 permits injection of the fluid 28 to pizza boxes "P" that are projected through the entrance opening 19.

The construction of the invention 10b, as illustrated in the FIGS. 4-6 for example, utilizes plural sets of accordion pleats 35 coextensively mounted along modified first and second side walls 16a and 17a to permit expansion and contraction of the interior and exterior side walls 14 and 15 relative to one another to accommodate a greater plurality of pizza boxes as required. It is of course understood that a further set of accordion pleats identical to those illustrated in FIGS. 4-6 are contained within the floor 18 to permit the extension of the exterior side wall 15 relative to the interior side wall 14.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pizza box refuse container, comprising,
   a primary refuse container, the primary refuse container including a primary container side wall defined by a predetermined height, and
   a refuse container selectively mounted to the primary container side wall, the refuse container including an interior side wall spaced from and parallel an exterior side wall, and
   a first end wall spaced from and parallel a second end wall to define a rectilinear parallelepiped configuration, and a floor fixedly and orthogonally mounted to a lower terminal end portion defined by the interior side wall, exterior side wall, first end wall, and second end wall, and a rectilinear opening defined by a continuous coplanar top edge, and a plurality of spaced supports mounted to the interior side wall projecting above the interior side wall, with the spaced supports spaced apart a predetermined spacing and mounted to the primary container side wall at a primary container side wall top edge, and the supports are defined by U-shaped supports, including a first leg, each first leg is fixedly mounted to the interior side wall projecting orthogonally above the coplanar top edge, and each support includes a second leg spaced from and parallel to the first leg to include a connecting web orthogonally mounted between the first leg and second leg of each support, wherein a predetermined height defined between the connecting web and the floor is equal to or less than the predetermined length defined by the primary container side wall, and the floor includes a plurality of rows of fluid injection members projecting interiorly of the refuse container orthogonally through the floor, and the floor includes a plurality of internally threaded bores, and each fluid injection member includes a rigid externally threaded support base, and the internally threaded bore is arranged to complementarily receive the externally threaded support base, and a resilient and compressible reservoir housing is mounted to an upper terminal end of the externally threaded base, with the reservoir housing positioned interiorly of the refuse container adjacent the floor, and each reservoir housing including a rigid injection head mounted coaxially aligned with the support base to a top surface of the reservoir housing, and the injection head including a primary fluid conduit in fluid communication interiorly of the reservoir housing, and the fluid conduit including a plurality of fluid conduit ports directed laterally of the fluid conduit.

2. An apparatus as set forth in claim 1 wherein the injection head includes a plurality of mounting and alignment barbs to fix and secure a pizza box side wall relative to the reservoir housing when the injection head is directed through the pizza box side wall.

3. An apparatus as set forth in claim 2 wherein the exterior side wall includes a lid plate hingedly mounted thereto, the lid plate includes a lid plate first edge spaced from the exterior side wall, and the first edge includes a plurality of first edge recesses spaced apart a predetermined spacing to receive the first legs of the space supports.

4. An apparatus as set forth in claim 3 including a plurality of fluid injection members projecting through the lid plate.

5. An apparatus as set forth in claim 4 wherein each reservoir housing includes a fluid contained therewithin.

6. An apparatus as set forth in claim 5 wherein the fluid is defined by a fumigant fluid.

7. An apparatus as set forth in claim 5 wherein the fluid is defined as a pesticide.

8. An apparatus as set forth in claim 5 wherein each end wall includes at least one set of accordion pleats, wherein each set of accordion pleats is coextensive with each end wall, and the floor includes a further set of accordion pleats, wherein the accordion pleats are an extension of the exterior side wall relative to the interior side wall.

* * * * *